US012711496B1

(12) United States Patent
Kommalapati et al.

(10) Patent No.: US 12,711,496 B1
(45) Date of Patent: Aug. 18, 2026

(54) HYBRID BLOCKCHAIN NETWORK FOR DYNAMIC CROSS-ACCOUNT TRANSFER OPERATIONS

(71) Applicant: State Farm Mutual Automobile Insurance Company, Bloomington, IL (US)

(72) Inventors: Ved Kommalapati, Bloomington, IL (US); Jacob Braun, Oviedo, FL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 235 days.

(21) Appl. No.: 18/523,582

(22) Filed: Nov. 29, 2023

(51) Int. Cl.
*G06Q 20/38* (2012.01)
*G06Q 20/40* (2012.01)

(52) U.S. Cl.
CPC ....... *G06Q 20/3827* (2013.01); *G06Q 20/405* (2013.01)

(58) Field of Classification Search
None
See application file for complete search history.

(56) References Cited

U.S. PATENT DOCUMENTS 10,861,015 B1 12/2020 Alt
10,943,680 B1 3/2021 Knas
2013/0035965 A1* 2/2013 Wood .................... G06Q 10/00 705/4
2015/0032585 A1* 1/2015 Grossman ............. G06Q 40/00 705/35
2017/0076384 A1* 3/2017 Dintenfass ............. G06Q 40/06
2019/0213564 A1* 7/2019 Chan ...................... H04L 63/062
2019/0304012 A1* 10/2019 Ramirez .............. G06Q 50/186
2023/0018133 A1* 1/2023 Burnette ............ G06Q 20/4016
2023/0267452 A1* 8/2023 Isogawa ............... G06Q 20/405 705/75

(Continued)

OTHER PUBLICATIONS

Ehrlich, "MetLife Plans To Disrupt $2.7 Trillion Life Insurance Industry Using Ethereum Blockchain," downloaded from https://www.forbes.com/sites/stevenehrlich/2019/06/19/metlife-plans-to-disrupt-2-7-trillion-life-insurance-industry-using-ethereum-blockchain/?sh=743ae20d2770 on Nov. 29, 2023, 5 pages.

*Primary Examiner* — Patrick Mcatee
*Assistant Examiner* — Jason B Fenstermacher
(74) *Attorney, Agent, or Firm* — Lee & Hayes, P.C.

(57) ABSTRACT

This document describes techniques for performing dynamic transfer operations based on a blockchain ledger without needing to perform computationally expensive cryptographic hash reversal operations. In some cases, an example system stores a hashed identifier on a blockchain ledger, along with one or more ledger values like an account balance value and/or a payout amount value. The example system may store un-hashed sensitive backend data on a private backend database. When the example system receives an event notification, the system extracts an identifier from the notification, hashes the identifier, and uses the hashed identifier to retrieve the blockchain ledger. The system then determines whether the ledger value(s) satisfy a condition. If so, the system uses the hashed identifier stored on the blockchain ledger to query the backend database for an account identifier, maps the account identifier to a blockchain wallet, and executes a blockchain transfer operation to the blockchain wallet.

20 Claims, 5 Drawing Sheets

(56) References Cited

U.S. PATENT DOCUMENTS

| | | | | |
|---|---|---|---|---|
| 2023/0385970 | A1* | 11/2023 | Reggiardo, III | G06Q 50/186 |
| 2024/0046362 | A1* | 2/2024 | Eason | G06Q 20/36 |
| 2024/0338689 | A1* | 10/2024 | De La Rosa | G06Q 20/3827 |

* cited by examiner

RECEIVE A REGISTRATION REQUEST 202

DETERMINE A RETRIEVAL KEY 204

STORE LEDGER 206

RECEIVE AN EVENT NOTIFICATION 208

DETERMINE RETRIEVAL KEY 210

RETRIEVE A CORRESPONDING LEDGER 212

LEDGER SATISFIES CONDITION? 214

YES

EXECUTE A TRANSFER OPERATION 216

NO

REFRAIN FROM EXECUTING TRANSFER OPERATIONS 226

DETERMINE EXECUTION OUTCOME 218

EXECUTION SUCCESSFUL? 220

YES

MAINTAIN THE LEDGER 224

MODIFY THE LEDGER 222

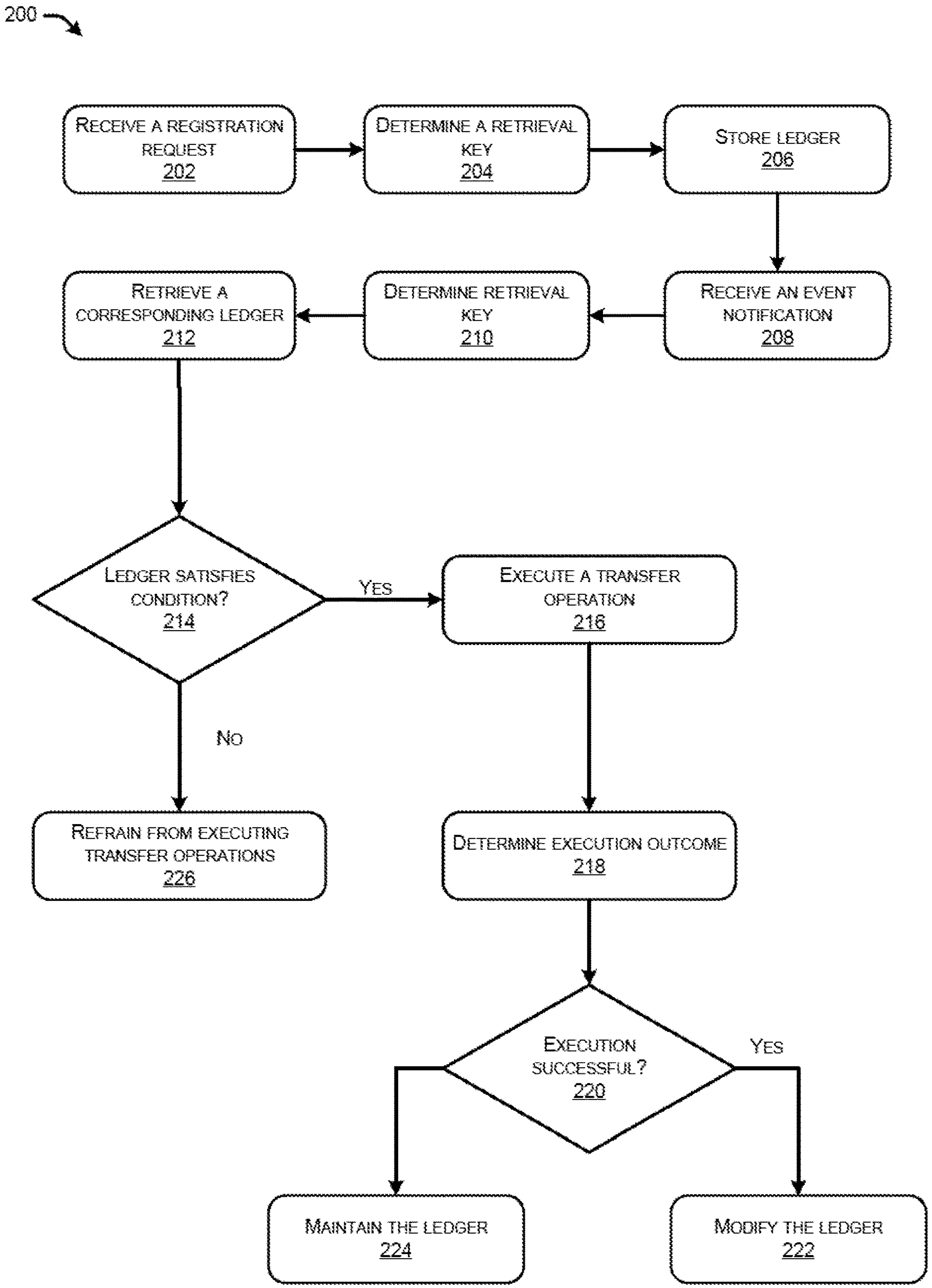

FIG. 2

HYBRID BLOCKCHAIN NETWORK FOR DYNAMIC CROSS-ACCOUNT TRANSFER OPERATIONS

TECHNICAL FIELD

The present disclosure relates to blockchain-based computer storage systems, and more particularly to techniques for data retrieval and storage on blockchain ledgers.

BACKGROUND

Many industries rely on centralized databases to store critical records and data. However, centralized databases have several limitations when it comes to data redundancy, transparency, and access speed. For example, centralized databases are more prone to data loss because it is harder to create a larger number of redundant database versions given a set of centralized database nodes. As another example, retrieval of data from a centralized database may be hampered if the centralized database and/or a network used to communicate with the centralized database suffers from performance issues. As another example, centralized databases may suffer from transparency issues resulting from a lack of direct access by external systems to the underlying data stored by the database.

In response, some solutions use blockchain technology to improve data redundancy, transparency, and access speed. However, there is a technical challenge associated with how to store data on a blockchain network to increase blockchain usage, reduce vulnerabilities associated with decentralized and/or public access to database ledgers, and reduce computational overheads associated with cryptographical operations. There is a need for techniques that use blockchain networks and non-blockchain storage mediums to balance security, transparency, and efficiency objectives.

Examples of the techniques described in the present disclosure are directed to overcoming the challenges and needs described above.

SUMMARY

In some examples, the techniques described herein relate to a computer-implemented method, including receiving, by a processor, a first event notification. The method further comprises based on receiving the first event notification. The method further includes executing an automated routine characterized by a first condition and a first transfer operation. The automated routine is configured to retrieve an identifier represented by the first event notification. The automated routine is further configured to apply a one-way hash function to the identifier to determine a hashed identifier. The automated routine is further configured to determine, based on the hashed identifier, a retrieval key. The automated routine is further configured to retrieve, based on the retrieval key, a distributed record comprising the retrieval key and a first value. The automated routine is further configured to determine, based on the first condition and the first value, whether to execute the first transfer operation. The automated routine is further configured to, based on determining to execute the first transfer operation, retrieve a first account identifier from a backend system using the retrieval key. The automated routine is further configured to, subsequent to retrieving the first account identifier, execute the first transfer operation in relation to the first account identifier and based on the first value. The automated routine is further configured to, subsequent to executing the first transfer operation, determine an execution outcome. The automated routine is further configured to update the first value stored on the distributed record based on the execution outcome.

In additional examples, the techniques described herein relate to a computing system, including: a processor; and memory storing computer-executable instructions that, when executed by the processor, cause the computing system to perform operations including receiving, by a processor, a first event notification. The method further comprises based on receiving the first event notification. The operations further include executing an automated routine characterized by a first condition and a first transfer operation. The automated routine is configured to retrieve an identifier represented by the first event notification. The automated routine is further configured to apply a one-way hash function to the identifier to determine a hashed identifier. The automated routine is further configured to determine, based on the hashed identifier, a retrieval key. The automated routine is further configured to retrieve, based on the retrieval key, a distributed record comprising the retrieval key and a first value. The automated routine is further configured to determine, based on the first condition and the first value, whether to execute the first transfer operation. The automated routine is further configured to, based on determining to execute the first transfer operation, retrieve a first account identifier from a backend system using the retrieval key. The automated routine is further configured to, subsequent to retrieving the first account identifier, execute the first transfer operation in relation to the first account identifier and based on the first value. The automated routine is further configured to, subsequent to executing the first transfer operation, determine an execution outcome. The automated routine is further configured to update the first value stored on the distributed record based on the execution outcome.

In further examples, the techniques described herein relate to one or more non-transitory computer-readable media storing computer-executable instructions that, when executed by the processor, cause the one or more processors to perform operations, including receiving, by a processor, a first event notification. The method further comprises based on receiving the first event notification. The operations further include executing an automated routine characterized by a first condition and a first transfer operation. The automated routine is configured to retrieve an identifier represented by the first event notification. The automated routine is further configured to apply a one-way hash function to the identifier to determine a hashed identifier. The automated routine is further configured to determine, based on the hashed identifier, a retrieval key. The automated routine is further configured to retrieve, based on the retrieval key, a distributed record comprising the retrieval key and a first value. The automated routine is further configured to determine, based on the first condition and the first value, whether to execute the first transfer operation. The automated routine is further configured to, based on determining to execute the first transfer operation, retrieve a first account identifier from a backend system using the retrieval key. The automated routine is further configured to, subsequent to retrieving the first account identifier, execute the first transfer operation in relation to the first account identifier and based on the first value. The automated routine is further configured to, subsequent to executing the first transfer operation, determine an execution outcome. The automated routine is further configured to update the first value stored on the distributed record based on the execution outcome.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 is a flowchart diagram of an example process for generating a blockchain ledger and using the blockchain ledger to perform a dynamic blockchain transfer operation.

DETAILED DESCRIPTION

This document describes techniques for performing dynamic transfer operations (e.g., conditional transfer operations and/or selective transfer operations) based on a blockchain ledger without needing to perform computationally expensive cryptographic hash reversal operations. In some cases, an example system stores a hashed identifier on a blockchain ledger, along with one or more ledger values like an account balance value and/or a payout amount value. The example system may store un-hashed sensitive backend data like an account number separately on a private backend database. When the example system receives an event notification (e.g., about a death or property damage), the system extracts an identifier from the notification, hashes the identifier, and uses the hashed identifier to retrieve the blockchain ledger. The system then determines whether the ledger value(s) stored on the blockchain ledger satisfy a condition. If the ledger value(s) satisfy the condition, the system uses the hashed identifier stored on the blockchain ledger to query the backend database for an account identifier, maps the account identifier to a blockchain wallet, and executes a blockchain transfer operation to the blockchain wallet. In some cases, by using the hashed identifier as a retrieval key and avoiding hash reversal operations as part of performing dynamic transfer operations, the system can efficiently perform conditional cryptocurrency transfers without exposing sensitive data on the public blockchain ledger.

Figure 1:
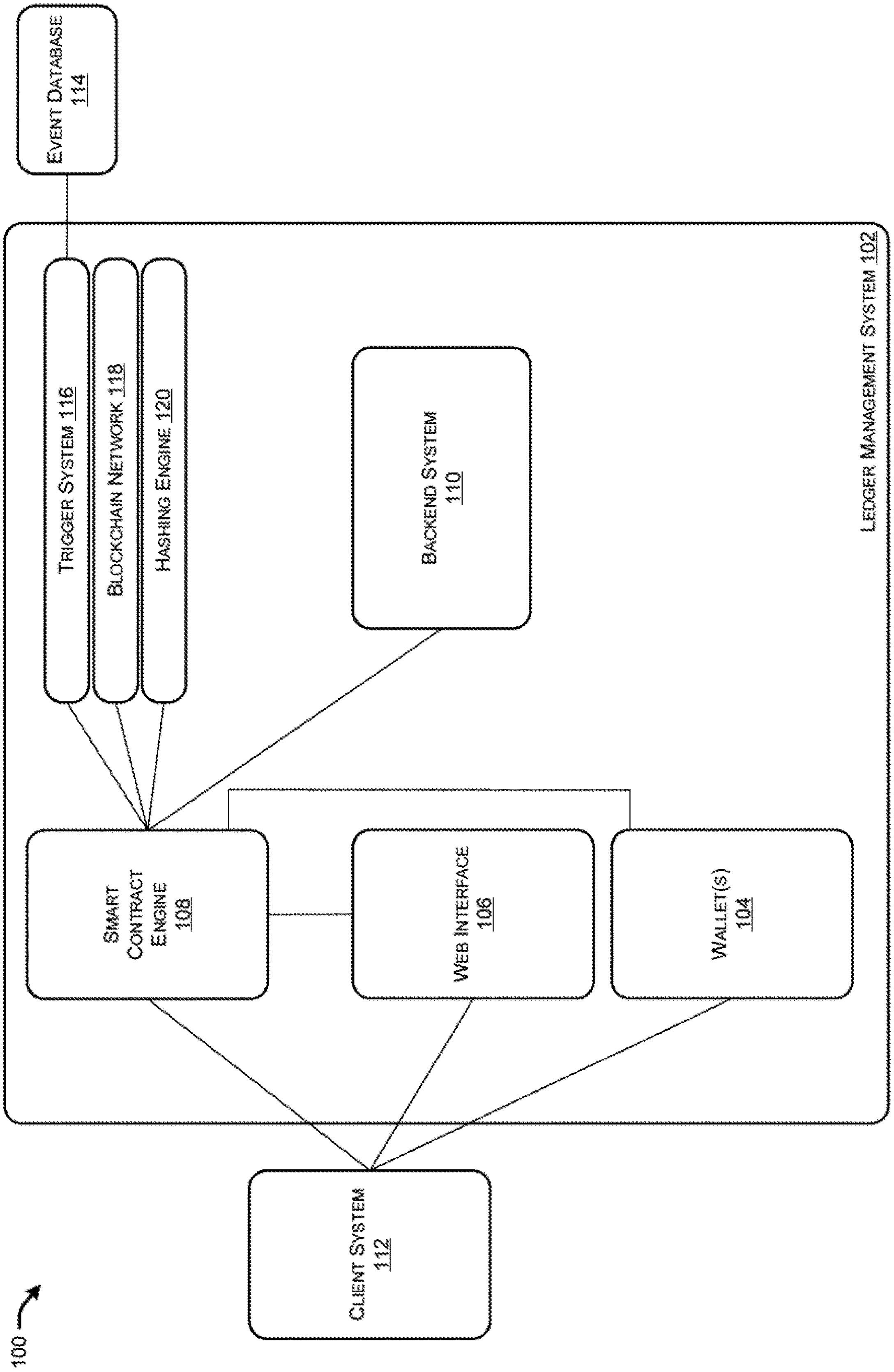
FIG. 1 depicts an environment for performing operations associated with a dynamic transfer operation using a blockchain ledger.

FIG. 1 depicts an environment 100 for performing operations associated with a dynamic transfer operation using a blockchain ledger. In some cases, the environment 100 enables a ledger management system 102 to maintain sensitive data needed for applying the conditions associated with a smart contract routine on a publicly accessible ledger without compromising the anonymity of such data. This may enable the ledger management system 102 to avoid performing hash reversal operations on hashed sensitive data when performing operations on a publicly accessible ledger. Accordingly, the environment 100 may reduce the computational load associated with performing ledger-related operations on a publicly accessing ledger by removing the need to perform computationally resource-intensive cryptographic operations configured to perform hash reversal with respect to hashed sensitive data.

For example, in some cases, the ledger management system 102 may perform operations associated with a smart contract routine in relation to a blockchain ledger by: (i) determining whether a value stored on the ledger satisfies a condition associated with the smart contract routine, (ii) based on (e.g., in response to) determining that the value satisfies the condition, retrieving a hashed identifier stored on the ledger, (iii) using the hashed identifier as a retrieval key to determine an account identifier from a backend system 110, and (iv) using the account identifier to perform a transfer operation with respect to a wallet 104 associated with the determined account identifier. As this example illustrates, the ledger management system 102 may be configured to perform a dynamic transfer operation without performing hash reversal operations on hashed data stored on a blockchain ledger.

As depicted in FIG. 1, environment 100 includes, in addition to the ledger management system 102, a client system 112 and an event database 114. The client system 112 may enable a user (e.g., an individual or an entity) to communicate with the ledger management system 102. For example, the client system 112 may include a personal computer device, a laptop device, and/or a mobile device that may enable the user to access the ledger management system (e.g., via the web interface 106 and/or by making an application programming interface (API) call to an API associated with the smart contract engine 108). In some cases, client system 112 enables the user to interact with the ledger management system 102 using a web browser application and/or a native smartphone application that is executed on the client system 112.

The event database 114 may be configured to store one or more event records associated with one or more identifiers. Examples of event records include death records associated with one or more individuals, accident records associated with one or more vehicles, and flooding records associated with one or more locations. For example, in some cases, an event record may describe that an event record may indicate that an individual associated with a particular identifier has died. In some cases, the event record associated with an individual's death may cause a transfer of a payout amount associated with the individual's life insurance policy to a cryptocurrency wallet associated with the policy. As another example, in some cases, an event record may describe that a building associated with a particular identifier has been subject to damage. In some cases, the event record associated with the building's damage may transfer of a payout amount associated with the building's insurance policy to a cryptocurrency wallet associated with the policy.

In some cases, the event database 114 communicates with the ledger management system 102 using an application programming interface (API). For example, the API may be configured to (e.g., periodically and/or in response to a trigger) query the event database 114 for one or more new event records. In some cases, after receiving an indication of a new event record from the event database 114, the API may transmit an event notification associated with the event record to the ledger management system 102 (e.g., to a trigger system 116) associated with the ledger management system 102.

The ledger management system 102 may be configured to: (i) receive a registration request (e.g., a request for registration and/or creation of an insurance policy, such as a life insurance policy) associated with an identifier (e.g., an individual identifier, such as a social security number), (ii) hash the identifier and store the hashed identifier on a blockchain ledger associated with the request; (iii) receive an event notification (e.g., a death notification) associated with the identifier, (iv) hash the identifier of the received notification, (v) map the hashed identifier to the blockchain ledger storing the same hashed identifier, (vi) apply a condition to the mapped ledger to determine whether the ledger satisfies the condition (e.g., whether a payout amount associated with the ledger exceeds zero and/or whether an account balance value associated with the ledger is zero), (v) based on determining that the ledger satisfies the condition, query the backend system 110 for an account identifier associated with the hashed identifier, (vi) detect a wallet 104 associated with the account identifier, and (vii) perform a transfer operation based on a value (e.g., a payout amount value) stored on the ledger and to the detected wallet.

As depicted in FIG. 1, the ledger management system 102 includes a set of wallets 104, a web interface 106, a smart contract engine 108, a backend system 110, a trigger system 116, a blockchain network 118, and a hashing engine 120. Wallets 104 may enable the ledger management system 102 to store cryptocurrencies associated with one or more registered accounts. In some cases, each wallet is associated with at least one of a private key, a public key, or a wallet address. The private key may be a secret code (e.g., a secret alphanumeric code) that may be used to access and control cryptocurrencies stored on the wallet. For example, the private key may be used to sign a transaction that the transfer cryptocurrency originates from the wallet (e.g., to provide a mathematical proof that the transaction originates from an authorized owner of the wallet). The public key may be a code (e.g., an alphanumeric code, such as an alphanumeric code derived from the private key) that may be used to send cryptocurrencies to the wallet. For example, the public key may be generated by applying a one-way hash transformation to the private key. The wallet address may be a hashed version of the public key and may be used as a unique address for transactions that transfer cryptocurrency into a wallet.

In some cases, after determining that a value (e.g., a payout amount value) associated with a blockchain ledger satisfies a condition associated with a smart contract routine, the smart contract routine may request a transfer of cryptocurrency funds corresponding to the updated value to a wallet associated with the ledger. For example, the smart contract routine may be configured to process a death notification by determining whether a payout amount value stored on a corresponding ledger satisfies a condition (e.g., exceeds zero and/or another predefined threshold). If the smart contract routine determines that a ledger corresponding to an event notification satisfies a condition, the smart contract routine may request an application programming interface (API) to transfer cryptocurrency funds equal to the payout amount value from a wallet owned by the insurance provider to the wallet associated with the ledger. This may enable automated transferring of the claim payout upon the smart contract routine processing and approving the claim based on the conditions encoded in its logic. In some cases, the transfer request may be signed using a public key associated with the recipient blockchain wallet.

The web interface 106 may enable the client system 112 to retrieve data from and/or provide data to the smart contract engine 108. For example, the web interface 106 may be a server associated with a web application (e.g., a browser-based application and/or a native application) that is being executed on the client system 112 to enable the user(s) to request and cause execution of operations associated with one or more web services associated with the ledger management system 102. Examples of web services that may be requested and/or delivered using the web interface 106 include displaying data associated with a user's wallet and/or a user's ledger. For example, the web interface 106 may enable the client system 112 to communicate with the ledger management system 102 to view account balances associated with wallets 104, view transaction histories associated with wallets 104, view and/or modify data (e.g., payment balances, coverage amounts, and/or communication account addresses) stored on the blockchain ledgers associated with the blockchain network 118), perform operations configured to transfer cryptocurrency from and/or to the wallets 104, and/or the like.

The smart contract engine 108 may be configured to execute operations associated with one or more smart contract routines. A smart contract routine may be a set of computer-implemented operations that executes a set of blockchain operations when the routine determines that one or more conditions are satisfied. Examples of blockchain operations include operations configured to transfer cryptocurrency funds from and/or to wallets 104, operations configured to view and/or modify data stored on the blockchain ledgers associated with the blockchain network 118, operations configured to generate and/or transmit one or more communications based on data associated with wallets 104 and/or data stored on the blockchain ledgers, and/or the like.

For example, a smart contract routine may be configured to: (i) receive a death notification associated with an identifier, (ii) perform a hashing operation on the identifier to determine a hashed identifier, (iii) identify and retrieve a blockchain ledger that stores the hashed identifier, (iv) determine whether an account balance value stored by the blockchain ledger exceeds zero, (v) based on determining that the account balance value exceeds zero, query the backend system 110 for an account identifier associated with the hashed identifier, (vi) detect a wallet 104 associated with the account identifier, and (vii) perform a transfer operation based on a value (e.g., a payout amount value) stored on the ledger and to the detected wallet.

As another example, a smart contract routine may be configured to: (i) receive a building damage notification associated with an identifier, (ii) perform a hashing operation on the identifier to determine a hashed identifier, (iii) identify and retrieve a blockchain ledger that stores the hashed identifier, (iv) determine whether an account balance value stored by the blockchain ledger exceeds zero, (v) based on determining that the account balance value exceeds zero, query the backend system 110 for an account identifier associated with the hashed identifier, (vi) detect a wallet 104 associated with the account identifier, and (vii) perform a transfer operation based on a value (e.g., a payout amount value) stored on the ledger and to the detected wallet.

As another example, a smart contract routine may be configured to: (i) receive a transaction notification associated with an identifier, (ii) perform a hashing operation on the identifier to determine a hashed identifier, (iii) identify and retrieve a blockchain ledger that stores the hashed identifier, (iv) determine whether a transaction amount value stored by the blockchain ledger exceeds zero, (v) based on determining that the transaction amount value exceeds zero, query the backend system 110 for an account identifier associated with the hashed identifier (e.g., an account identifier associated with a recipient of a transaction), (vi) detect a wallet 104 associated with the account identifier, and (vii) perform a transfer operation based on a value (e.g., a transaction amount value) stored on the ledger and to the detected wallet. For example, the smart contract routine may transfer the transaction amount value from a cryptocurrency wallet associated with a payor account and/or an escrow account to a cryptocurrency wallet associated with a recipient account.

As these examples illustrate, in some cases, a smart contract routine may be characterized by at least one of a condition or a transfer operation. The condition may define a condition whose satisfaction or lack of satisfaction affects the set of operations performed by the smart contract. The transfer operation may include a transfer between two or more cryptocurrency wallets and/or two or more cryptocurrency accounts that is performed based on determining that a blockchain ledger satisfies a condition.

In some cases, the smart contract routine is an example of an automated routine that may be performed by the ledger management system 102. An automated routine may, in the context of a blockchain-related system, refer to a set of computer-implemented operations that are executed automatically based on predetermined conditions being satisfied by a database ledger (and/or other distributed record maintained by a blockchain-related system). For instance, a smart contract routine may include code that is stored on a blockchain ledger and that self-executes when certain conditions defined in the smart contract are fulfilled. By automating routines like transfers, payments, and other ledger-based operations in a smart contract, the ledger management system 102 may be able to create trust, reduce reliance on manual interventions, and increase efficiency in the management of ledger-based transactions. Other examples of automated routines include automatically redistributing assets to beneficiaries upon an account holder's passing or automatically releasing escrowed funds to a seller once an item is confirmed as delivered. By codifying business logic into smart contract routines, the ledger management system 102 may enable complex operations to be performed on the blockchain in a transparent and automated manner. Accordingly, in some cases, all of the operations described herein as being performed with respect to a smart contract routine may be performed with respect to any other type of an automated routine too.

In some cases, a blockchain ledger is an example of a distributed record. A distributed record, in the context of a blockchain-related system, may refer to a set of data fields stored on two or more different computing devices in a network. For example, a distributed record may include a number of cryptographically linked blocks, with each block storing multiple data entries. The blocks may be stored in a distributed manner and across various nodes in a peer-to-peer blockchain network, with each node maintaining a copy of the record. This storage arrangement may lead to redundancy as well as consensus, as changes to the blockchain ledger must be validated and accepted by a majority of nodes. In some cases, the decentralized and distributed nature of blockchain ledgers make them highly resilient to outages or manipulation, since there is no single point of failure. Other examples of distributed records enabled by blockchain include decentralized identity records, supply chain tracking records, distributed file storage records, and non-fungible token (NFT) records. Accordingly, in some cases, all of the operations described herein as being performed with respect to a blockchain ledger may be performed with respect to any other type of a distributed record too.

In some cases, a cryptocurrency wallet is an example of a distributed account. A distributed account may be a digital identity on a distributed network that can hold funds and/or values, and/or interact with decentralized applications. A distributed account may enable users to receive, store, and transfer content (e.g., content representing cryptocurrency values) on a blockchain ledger. In some cases, distributed accounts more broadly represent user identities that can execute transactions and/or be assigned access permissions on a distributed network. For example, a distributed account may represent an identity in a decentralized authentication system (e.g., to represent one or more attestations and/or one or more claims about the account owner). Accordingly, in some cases, all of the operations described herein as being performed with respect to a wallet may be performed with respect to any other type of a distributed account too.

The backend system 110 may be configured to store non-ledger data used by the smart contract engine 108 to perform smart contract operations. For example, the backend system 110 may include a database (e.g., a relational database, an unstructured database, a graph-based database, an object-oriented database, and/or the like) that stores data used by the smart contract engine 108 to perform smart contract operations.

In some cases, the smart contract engine 108 may be configured to perform operations associated with a smart contract based on: (i) data stored on the blockchain ledgers associated with the blockchain network 118, and (ii) data stored on the database(s) associated with the backend system 110. For example, the backend system 110 may store at least one of the following: (i) hashed identifiers associated with the blockchain ledgers, or (ii) account identifiers (e.g., wallet identifiers) associated with the blockchain ledgers. In some cases, a record stored by the backend system 110 includes a set of data fields associated with a blockchain ledger. For example, the record associated with a blockchain ledger may represent an account identifier associated with the blockchain ledger. In some cases, the hashed identifier associated with a blockchain ledger is a retrieval key (e.g., a primary key) for the record associated with the ledger.

As depicted in FIG. 1, the smart contract engine 108 may communicate with a trigger system 116. The trigger system 116 may be configured to provide an event notification to the smart contract engine 108 that causes the smart contract engine 108 to perform operations associated with at least one smart contract routine. For example, the trigger system 116 may execute operations associated with a blockchain oracle routine. A blockchain oracle routine may be configured to provide an event notification based on an event detected based on a database that is external to the ledger management system 102 and/or reported by a software application that is executed outside the ledger management system 102. An example of a blockchain oracle routine is a routine that queries an external event database (e.g., a death reporting database) to determine that a new event record has been added to the event database and, in response, determine an event notification and provide the event notification to the smart contract engine 108. For example, the blockchain oracle routine may provide an event notification to the smart contract engine 108 each time a new death record is detected.

In some cases, the trigger system 116 may provide different sets of event notifications each associated with a different event type. For example, the trigger system may provide a set of death-related event notifications, a set of accident-related event notifications, a set of event notifications related to property damage, a set of event notifications related to transaction completion, and/or the like. In some cases, an event type is associated with a smart contract routine. In some cases, the smart contract routine is characterized by a transfer ratio that describes a ratio of a value associated with a blockchain ledger that should be subject to a transfer operation associated with the blockchain ledger.

For example, the set of death-related event notifications may be associated with a smart contract routine whose respective transfer operation requires the transfer of a defined ratio (e.g., 100 percent) of account payout values to corresponding account identifiers. As another example, the set of damage-related event notifications may be associated with a smart contract routine whose respective transfer operation requires the transfer of a defined ratio (e.g., 100 percent) of account payout values to corresponding account identifiers. As a further example, the set of transaction-related event notifications may be associated with a smart contract routine whose respective transfer operation requires the transfer of a defined ratio (e.g., 100 percent) of transaction escrow values to corresponding account identifiers.

The blockchain network 118 may be configured to store one or more blockchain ledgers. A blockchain ledger may include one or more data fields, such as one or more data fields stored using a set of cryptographically linked blocks. The blockchain network 118 may store the blockchain ledgers redundantly across one or more computing nodes, rather than on a centralized storage location. Updates to one copy of the blockchain ledgers may be distributed to other copies via one or more synchronization operations.

A blockchain ledger stored on blockchain network 118 may store one or more data fields that may be used by a smart contract routine to determine whether a condition associated with the routine has been satisfied. For example, a blockchain ledger may store an account balance value, and a condition associated with a smart contract routine may be characterized by a threshold value for the account balance value. As another example, a blockchain ledger may store whether an event is recorded to have occurred, and a condition associated with a smart contract routine may be characterized by a condition defined by the occurrence of the corresponding event.

In some cases, a blockchain ledger stored on blockchain network 118 stores: (i) a set of numeric values (e.g., an account balance value and/or a payout amount value) associated with a corresponding registered account, and (ii) a hashed identifier (e.g., a hashed social security number, a hashed identifier of an account holder associated with the ledger, and/or the like).

For example, a blockchain ledger stored on blockchain network 118 may store: (i) an account balance value associated with a corresponding registered account, (ii) a payout amount value associated with the corresponding registered account, and (iii) a hashed identifier of an account holder associated with the corresponding registered account. In some cases, when triggered (e.g., based on an event notification provided to the smart contract engine 108 by the trigger system 116), the smart contract engine 108 may execute operations of a smart contract routine that is configured to: (i) retrieve a blockchain ledger associated with a hashed identifier; (ii) determine whether the payout amount value associated with the retrieved ledger fails to satisfy a threshold condition (e.g., fails to exceed zero); (iii) if the payout amount value associated with the retrieved ledger fails to satisfy the threshold condition, refrain from performing a transfer operation; and (iv) if the payout amount value associated with the retrieved ledger fails to satisfy the threshold condition: (a) determine, by querying the backend system 110 based on the hashed identifier, an account identifier associated with the ledger, (b) determine a wallet 104 associated with the account identifier, (c) perform a transfer operation associated with the payout amount value to a wallet associated with the determined account identifier, and (d) subsequent to performing the transfer operation, updating the payout amount value (e.g., to reduce the transferred value from the payout amount value).

As another example, a blockchain ledger stored on blockchain network 118 may store: (i) a transaction amount value associated with a corresponding registered account, and (ii) a hashed identifier of an account holder associated with the corresponding registered account. In some cases, when triggered (e.g., based on an event notification provided to the smart contract engine 108 by the trigger system 116), the smart contract engine 108 may execute operations of a smart contract routine that is configured to: (i) retrieve a blockchain ledger associated with a hashed identifier; (ii) determine whether the transaction amount value associated with the retrieved ledger fails to satisfy a threshold condition (e.g., fails to exceed zero); (iii) if the transaction amount value associated with the retrieved ledger fails to satisfy the threshold condition, refrain from performing a transfer operation; and (iv) if the transaction amount value associated with the retrieved ledger fails to satisfy the threshold condition: (a) determine, by querying the backend system 110 based on the hashed identifier, an account identifier associated with the ledger, (b) determine a wallet 104 associated with the account identifier, (c) perform a transfer operation associated with the transaction amount value to a wallet associated with the determined account identifier, and (d) subsequent to performing the transfer operation, updating the transaction amount value (e.g., to reduce the transferred value from the payout amount value).

In some cases, while the backend system 110 is a centralized storage framework (e.g., a centralized storage framework that is not publicly accessible), the blockchain network 118 is a decentralized storage framework (e.g., a decentralized storage framework that is publicly accessible). For example, the backend system 110 may include databases and/or servers that are privately operated within the ledger management system 102 and are not exposed externally, while the blockchain network 118 may enable public access to the blockchain ledgers. In some cases, external nodes may participate in the blockchain network 118 to maintain a decentralized ledger replication and consensus process, while the data in the backend system 110 may serve as internal system configuration data. In some cases, by combining both centralized and decentralized storage frameworks, the overall system may enable transparency for user data and security for system configuration data.

For example, the backend system 110 may include one or more centralized servers and/or databases operated by the entity associated with the ledger management system 102. Meanwhile, the blockchain network 118 may include a distributed network of nodes with copies of blockchain ledgers distributed across many devices not centrally managed. This may be because, while the decentralized nature of the blockchain network 118 enhances immutability, integrity, and/or public accessibility of the stored ledger data, the backend system 110 provides centralized, scalable storage and retrieval of supplemental non-ledger data. Accordingly, blockchain network 118 may ensure that the core account balance, event log, and/or identifier data remain decentralized and independently verifiable through the underlying blockchain consensus mechanisms.

As further depicted in FIG. 1, the ledger management system 102 includes a hashing engine 120 that is configured to process a data field provided by the smart contract engine 108 (e.g., a ledger identifier value, such as a policy identifier value) and apply a hash function (e.g., a one-way hash function) to the data field to generate a hashed data field (e.g., a hashed communication account). The hashed value may then be stored on a blockchain ledger stored on the blockchain network 118. In some cases, subsequent to storing a hashed data field (e.g., a hashed ledger identifier) on a blockchain ledger, the smart contract engine 108 stores backend data associated with the corresponding hashed data field (e.g., an account identifier and/or a wallet identifier) on the backend system 110 (e.g., in association with the hashed data field, such as by using the hashed data field as the retrieval key and/or the primary key for storing and/or retrieval of the associated data). For example, the smart contract engine 108 may store a hashed identifier on a corresponding blockchain ledger and then store the corresponding backend data on the backend system 110, where the backend system 110 may represent that the hashed identifier and the backend data are related.

In some cases, backend data associated with a blockchain ledger may include un-hashed sensitive data that is not stored on the blockchain ledger. For example, the backend system 110 may store personal identifying information and/or confidential account numbers that should not be publicly visible on the blockchain ledger. By only storing hashed values and/or non-sensitive values on the blockchain ledger, the ledger management system 102 can keep sensitive backend data private without the need to perform resource-intensive cryptographic operations. In some cases, this dynamic disclosure model enhances privacy without losing excessive reliance on cryptographic operations.

Accordingly, various components of environment 100 enable performing dynamic transfer operations in a ledger management system 102 based on non-sensitive and/or hashed data stored on a blockchain ledger, but without the need to perform hash-reversal operations associated with respect to the data stored on the blockchain ledger. In some cases, at a first time, the ledger management system 102: (i) receives a registration request associated with an identifier, (ii) processes the identifier with the hashing engine 120 to generate a hashed identifier, (iii) stores the hashed identifier and one or more values associated with the registration request (e.g., an account balance value and/or a payout value) on a blockchain ledger associated with the registration request, and (vi) stores backend data (e.g., sensitive data, such as wallet identifier data) associated with the registration request on the backend system 110. In some cases, at a subsequent time, the ledger management system 102: (i) receives an event notification associated with the identifier, (ii) processes the identifier with the hashing engine 120 to generate a hashed identifier, (iii) retrieves, based on the hashed identifier, the one or more values stored on the ledger, (iv) determines whether the values satisfy a condition associated with a smart contract routine triggered by the event notification, (v) if the ledger values satisfy the smart contract condition, retrieves an account identifier from the backend system 110 by using the hashed identifier at a retrieval key and performs a transfer operation based on transferring a target value (e.g., an account payout value) determined based on the ledger to a wallet associated with the retrieved account identifier, and (vi) if the ledger values fail to satisfy the smart contract condition, refrains from performing any blockchain transfer operations.

In some cases, the techniques described herein improve the computational efficiency of using a publicly accessible blockchain network to perform dynamic blockchain transfer operations. For example, in some cases, a smart contract routine may directly use hashed data accessible on public blockchain ledgers to retrieve backend data needed to perform computations associated with performing blockchain transfer operations. This enables the smart contract routine to avoid having to perform any cryptographic operations associated with the decoding of sensitive data stored on blockchain ledgers. By reducing computationally expensive and resource-intensive operations associated with cryptographically decoding ledger data, the techniques described herein may improve the computational efficiency of using a publicly accessible blockchain network to perform dynamic blockchain transfer operations.

In some cases, the techniques described herein improve the speed and/or reliability of performing dynamic blockchain transfer operations. As described above, in some cases, the techniques described herein enable a smart contract routine to heavily rely on data accessible on blockchain ledgers to perform computations needed to determine whether and/or how to perform dynamic blockchain transfer operations. Accordingly, the techniques described herein may limit the need for data stored on non-blockchain storage systems for performing dynamic blockchain transfer operations. Using blockchain ledgers to perform critical computations associated with dynamic blockchain transfer operations is likely to improve the speed and/or reliability of such transfer operations because blockchain networks are likely to be stored in a distributed manner and with replication to reduce access latency and/or increase access availability. Accordingly, the techniques described herein may enable faster and more reliable processing of dynamic blockchain transfer operations by leveraging the inherent performance benefits of decentralized blockchain data storage and transmission.

FIG. 2 is a flowchart diagram of an example process 200 for generating a blockchain ledger and using the blockchain ledger to perform a dynamic blockchain transfer operation. As depicted in FIG. 2, at operation 202, the smart contract engine 108 receives a registration request. The registration request may be a request to generate a new account (e.g., a new insurance policy) associated with the ledger management system 102 and/or a request to store a new blockchain ledger associated with a new account on the blockchain network 118.

At operation 204, the smart contract engine 108 determines a first retrieval key associated with the registration request. In some cases, to determine the first retrieval key, the smart contract engine 108 processes an identifier associated with the registration request (e.g., an identifier stored as part of the registration request) using the hashing engine 120. The identifier may be a unique identifier of an account holder and/or an entity associated with the registration request, such as a unique identifier of a policyholder, a vehicle, and/or a building associated with an insurance policy.

At operation 206, the smart contract engine 108 stores a first blockchain ledger associated with the registration request on the blockchain network 118. The blockchain ledger may include at least one of the following: (i) the first retrieval key (e.g., the hashed identifier associated with the registration request), and (ii) one or more first ledger values (e.g., an account balance value and/or a payout amount value) associated with the registration. In some cases, the first ledger values are included in the registration request.

At operation 208, the smart contract engine 108 receives an event notification from the trigger system 116. The trigger system 116 may generate the event notification by: (i) querying the event database 114 to detect a new event record, (ii) identifying a second identifier and an event type associated with the event record, and (iii) determining the event notification to represent the second identifier and the event type. For example, the event notification may represent at least one of an individual's death, a vehicle's accident, a transaction's completion, or a property's damage.

At operation 210, the smart contract engine 108 determines a second retrieval key based on the event notification. In some cases, to determine the second retrieval key associated with the event notification, the smart contract engine 108: (i) receives the event notification, (ii) extracts the second identifier from the event notification, and (iii) processes the second identifier using the hashing engine 120 to determine the second retrieval key.

At operation 212, the smart contract engine 108 retrieves a second blockchain ledger from the blockchain ledger based on the second retrieval key. To retrieve the second blockchain ledger, the smart contract engine 108 may query the blockchain network 118 to detect the blockchain ledger corresponding to the second retrieval key. Accordingly, in some cases, the smart contract engine 108 may use hashed identifiers as keys to index and/or retrieve blockchain ledgers.

At operation 214, the smart contract engine 108 determines whether the second blockchain ledger satisfies a condition. The condition may be associated with a smart contract routine triggered by the event notification received at operation 208. In some cases, to determine whether a blockchain ledger satisfies a condition, the smart contract engine 108 applies the condition to one or more values (e.g., an account balance value and/or a payout amount value) stored on the blockchain ledger. For example, in some cases, the smart contract engine 108 may determine whether a blockchain ledger satisfies the condition if the account balance value associated with the ledger is zero. As another example, in some cases, the smart contract engine 108 may determine whether a blockchain ledger satisfies the condition if the payout amount value associated with the ledger exceeds zero. As another example, in some cases, the smart contract engine 108 may determine whether a blockchain ledger satisfies the condition if: (i) the account balance value associated with the ledger is zero, and (ii) the payout amount value associated with the ledger exceeds zero. As another example, in some cases, the smart contract engine 108 may determine whether a blockchain ledger satisfies the condition if: (i) the account balance value associated with the ledger is zero, and/or (ii) the payout amount value associated with the ledger exceeds zero.

If the smart contract engine 108 determines that the second blockchain ledger satisfies the condition (operation 214—Yes), the smart contract engine 108 proceeds to operation 216 to execute a transfer operation based on the second blockchain ledger. In some cases, to execute the transfer operation, the smart contract engine 108: (i) queries the backend system 110 for an account identifier associated with the second blockchain ledger, (ii) maps the account identifier to a wallet, and (iii) performs the transfer operation by performing a transfer amount determined based on one or more values stored on the ledger (e.g., the payout amount value) to the wallet. In some cases, to execute the transfer operation, the smart contract engine 108: (i) queries the backend system 110 for an account identifier associated with the second blockchain ledger, (ii) maps the account identifier to a wallet, (iii) determines a transfer ratio associated with the event type associated with the event notification and/or with the corresponding smart contract routine, and (iv) performs the transfer operation by performing a transfer amount determined based on applying the transfer ratio to a value stored on the ledger (e.g., the payout amount value) to the wallet.

At operation 218, the smart contract engine 108 determines an execution outcome associated with the execution of the transfer operation. The execution outcome may represent whether the execution of the transfer operation was successful or not. For example, the execution outcome may represent that the execution of the transfer operation was unsuccessful (e.g., because of the unavailability of the wallet API, because of a network connectivity issue, and/or the like).

At operation 220, the smart contract engine 108 determines whether the execution outcome indicates that the execution of the transfer operation was successful. If the smart contract engine 108 determines that the execution outcome indicates that the execution of the transfer operation was successful (operation 220—Yes), the smart contract engine 108 proceeds to operation 222 to modify the second blockchain ledger. For example, the smart contract engine 108 may modify the second blockchain ledger by reducing the transfer amount value associated with the transfer operation from a value (e.g., an account payout value) associated with the second blockchain ledger.

If the smart contract engine 108 determines that the execution outcome indicates that the execution of the transfer operation was unsuccessful (operation 220—No), the smart contract engine 108 proceeds to operation 224 to refrain from modifying the second blockchain ledger. For example, the smart contract engine 108 may refrain from reducing the transfer amount value associated with the transfer operation from a value (e.g., an account payout value) associated with the second blockchain ledger.

If the smart contract engine 108 determines that the second blockchain ledger fails to satisfy the condition (operation 214—No), the smart contract engine 108 proceeds to operation 226 to refrain from executing a transfer operation with respect to the second blockchain ledger. For example, the smart contract engine 108 may refrain from executing any blockchain transfer operations because the payout amount value for the ledger indicates that the corresponding account is not entitled to any payout amounts.

Accordingly, in some cases, the process 200 enables the smart contract engine 108 to generate a blockchain ledger and use the blockchain ledger to perform a dynamic blockchain transfer operation. To do so, the smart contract engine 108 may use an identifier associated with a registration request to generate a hashed identifier that is included in the corresponding distributed ledger. Upon receiving an event notification that represents the same identifier, the smart contract engine 108 may again hash the identifier and use the hashed identifier to retrieve a blockchain ledger from the blockchain network 118. The smart contract engine 108 may then execute a transfer operation if the retrieved ledger satisfies a threshold condition. If the execution is successful, the smart contract engine 108 updates a value stored on the ledger based on the transfer amount associated with the successful transfer operation.

Figure 3:
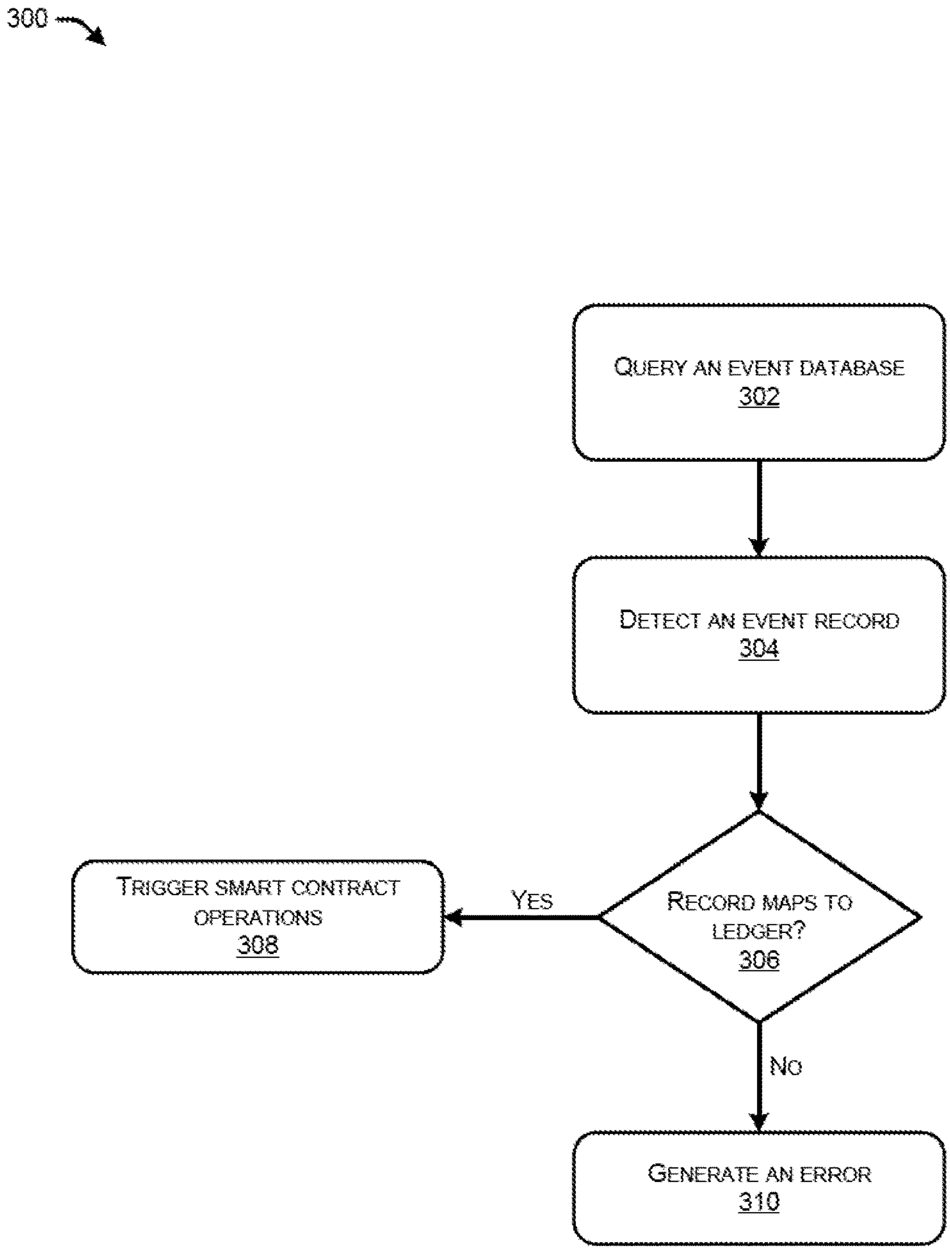
FIG. 3 is a flowchart diagram of an example process for processing an event notification using operations associated with a corresponding smart contract routine.

FIG. 3 is a flowchart diagram of an example process 300 for processing an event notification using operations associated with a corresponding smart contract routine. As depicted in FIG. 3, at operation 302, the trigger system 116 queries the event database 114. The event database 114 may be configured to store one or more event records associated with one or more identifiers. Examples of event records include death records associated with one or more individuals, accident records associated with one or more vehicles, and flooding records associated with one or more locations.

At operation 304, the trigger system 116 detects a new event record stored on the event database 114. For example, the trigger system 116 may detect the new event record by querying for event records whose event times (e.g., event occurrence times, event record generation times, and/or the like) fall after a prior query time. The prior query time may be a time associated with a prior query by the trigger system 116 to retrieve event records from the event database 114.

At operation 306, the smart contract engine 108 determines whether the new event record maps to a blockchain ledger stored on the blockchain network 118. In some cases, the smart contract engine 108: (i) receives an event notification corresponding to the new event record from the trigger system 116, (ii) retrieves the identifier included in the event notification, (iii) processes the identifier using the hashing engine 120 to determine a hashed identifier, and (iv) determines (e.g., by querying an API associated with the blockchain network 118) whether the blockchain network 118 includes a blockchain ledger that includes the hashed identifier as its respective retrieval key.

If the smart contract engine 108 determines that the new event record maps to a particular blockchain ledger (operation 306—Yes), the smart contract engine 108 proceeds to operation 308 to trigger smart contract operations associated with the event record. The smart contract engine 108 may: (i) determine a smart contract routine that corresponds to an event type of the event record, and (ii) trigger operations associated with the smart contract routine. The smart contract routine may be configured to apply a condition to the blockchain ledger and execute operations associated with a blockchain transfer operation in response to determining that the blockchain ledger satisfies the condition.

If the smart contract engine 108 determines that the new event record fails to map to a particular blockchain ledger (operation 306—No), the smart contract engine 108 proceeds to operation 310 an error. The error may indicate that an identifier is not associated with a blockchain ledger stored on the blockchain network 118. The error may be logged in the backend system 110 for inspection by a system administrator.

Accordingly, in some cases, the process 300 enables the ledger management system 102 to trigger smart contract routines based on event records determined by querying the event database 114. The ledger management system 102 may determine to trigger a smart contract routine if the hashed identifier associated with an event record matches the hashed identifier of a blockchain ledger stored on the blockchain network 118. If no blockchain ledgers correspond to an event record, the ledger management system 102 may generate an error indicating the mismatch.

Figure 4:
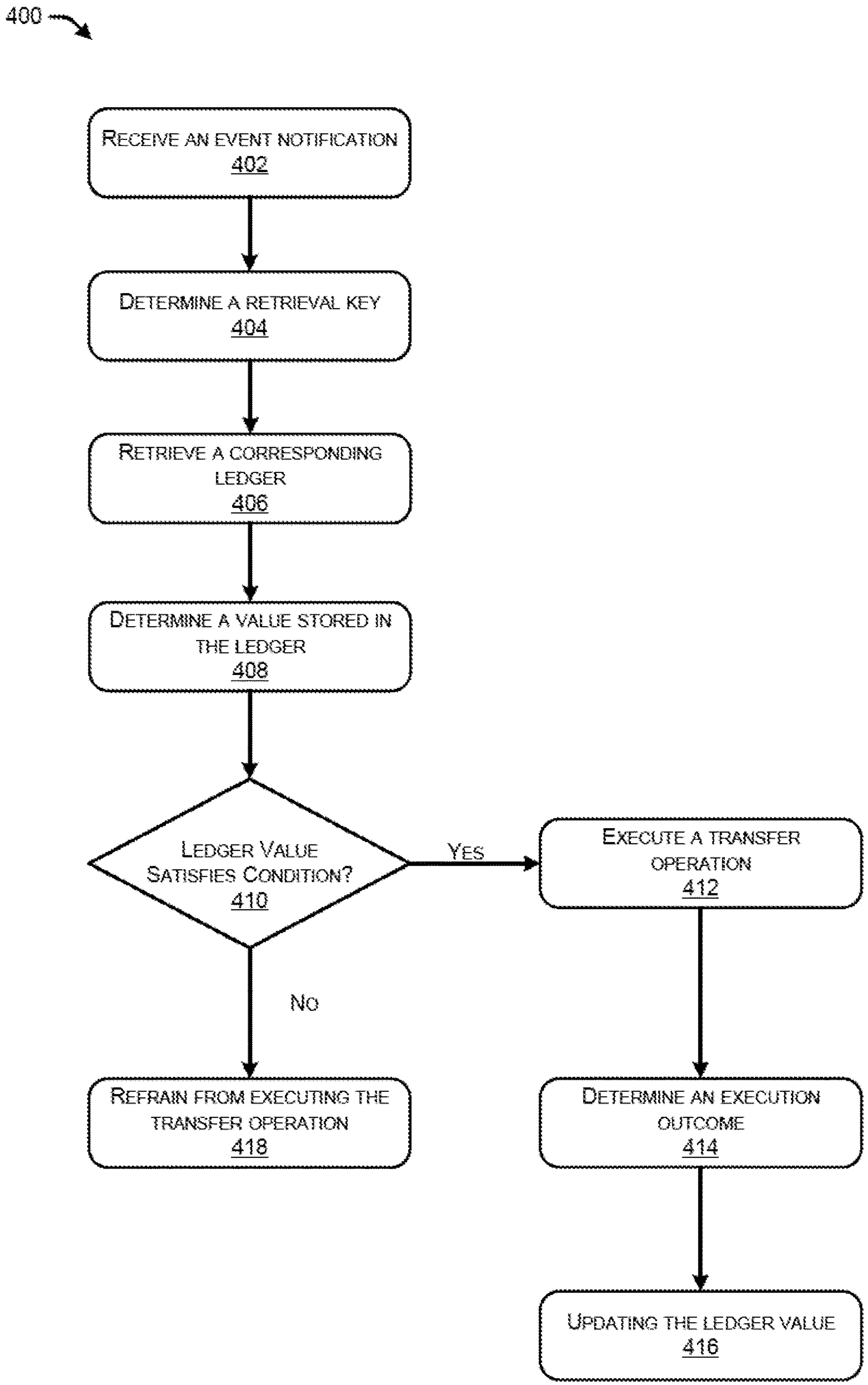
FIG. 4 is a flowchart diagram of an example process for performing operations associated with a dynamic transfer operation using a blockchain ledger.

FIG. 4 is a flowchart diagram of an example process 400 for performing operations associated with a dynamic transfer operation using a blockchain ledger. As depicted in FIG. 4, at operation 402, the smart contract engine 108 receives an event notification. In some cases, the smart contract engine 108 receives an event notification from the trigger system 116. The trigger system 116 may generate the event notification by: (i) querying the event database 114 to detect a new event record, (ii) identifying a second identifier and an event type associated with the event record, and (iii) determining the event notification to represent the second identifier and the event type. For example, the event notification may represent at least one of an individual's death, a vehicle's accident, a transaction's completion, or a property's damage.

At operation 404, the smart contract engine 108 determines a retrieval key based on the event notification. In some cases, to determine the retrieval key based on the event notification, the smart contract engine 108: (i) receives the event notification, (ii) extracts an identifier from the event notification, and (iii) processes the identifier using the hashing engine 120 to determine the retrieval key. The identifier may be a unique identifier of an account holder and/or an entity associated with the registration request, such as a unique identifier of a policyholder, a vehicle, and/or a building associated with an insurance policy.

At operation 406, the smart contract engine 108 retrieves a blockchain ledger from the blockchain network 118 based on the retrieval key. To retrieve the blockchain ledger, the smart contract engine 108 may query the blockchain network 118 to detect the blockchain ledger corresponding to the retrieval key. The smart contract engine 108 may query the blockchain network 118 using an API associated with the blockchain network 118.

At operation 408, the smart contract engine 108 determines a ledger value stored on the retrieved blockchain ledger. The ledger value may be a numeric value stored on the blockchain ledger, such as a value determined based on an account balance value and/or a payout amount value stored on the retrieved blockchain ledger.

At operation 410, the smart contract engine 108 determines whether the ledger value satisfies a condition. For example, the smart contract engine 108 may determine whether the account balance value associated with the ledger is zero. As another example, the smart contract engine 108 may determine whether a blockchain ledger satisfies the condition if the payout amount value associated with the ledger exceeds zero.

If the smart contract engine 108 determines that the ledger value satisfies the condition (operation 410—Yes), the smart contract engine 108 proceeds to operation 412 to execute a transfer operation associated with the retrieved ledger. In some cases, to execute the transfer operation, the smart contract engine 108: (i) queries the backend system 110 for an account identifier associated with the blockchain ledger, (ii) maps the account identifier to a wallet, and (iii) performs the transfer operation by performing a transfer amount determined based on one or more values stored on the ledger (e.g., the payout amount value) to the wallet.

At operation 414, the smart contract engine 108 determines an execution outcome associated with the execution of the transfer operation. The execution outcome may represent whether the execution of the transfer operation was successful or not. For example, the execution outcome may represent that the execution of the transfer operation was unsuccessful (e.g., because of the unavailability of the wallet API, because of a network connectivity issue, and/or the like).

At operation 416, the smart contract engine 108 updates the ledger based on the execution outcome. In some cases, if the smart contract engine 108 determines that the execution outcome indicates that the execution of the transfer operation was successful, the smart contract engine 108 proceeds to operation 222 to modify the blockchain ledger. For example, the smart contract engine 108 may modify the blockchain ledger by reducing the transfer amount value associated with the transfer operation from a value (e.g., an account payout value) associated with the blockchain ledger.

If the smart contract engine 108 determines that the ledger value fails to satisfy the condition (operation 410—Yes), the smart contract engine 108 proceeds to operation 418 to refrain from executing a transfer operation associated with the retrieved ledger. For example, the smart contract engine 108 may refrain from reducing the transfer amount value associated with the transfer operation from a value (e.g., an account payout value) associated with the blockchain ledger.

Figure 5:
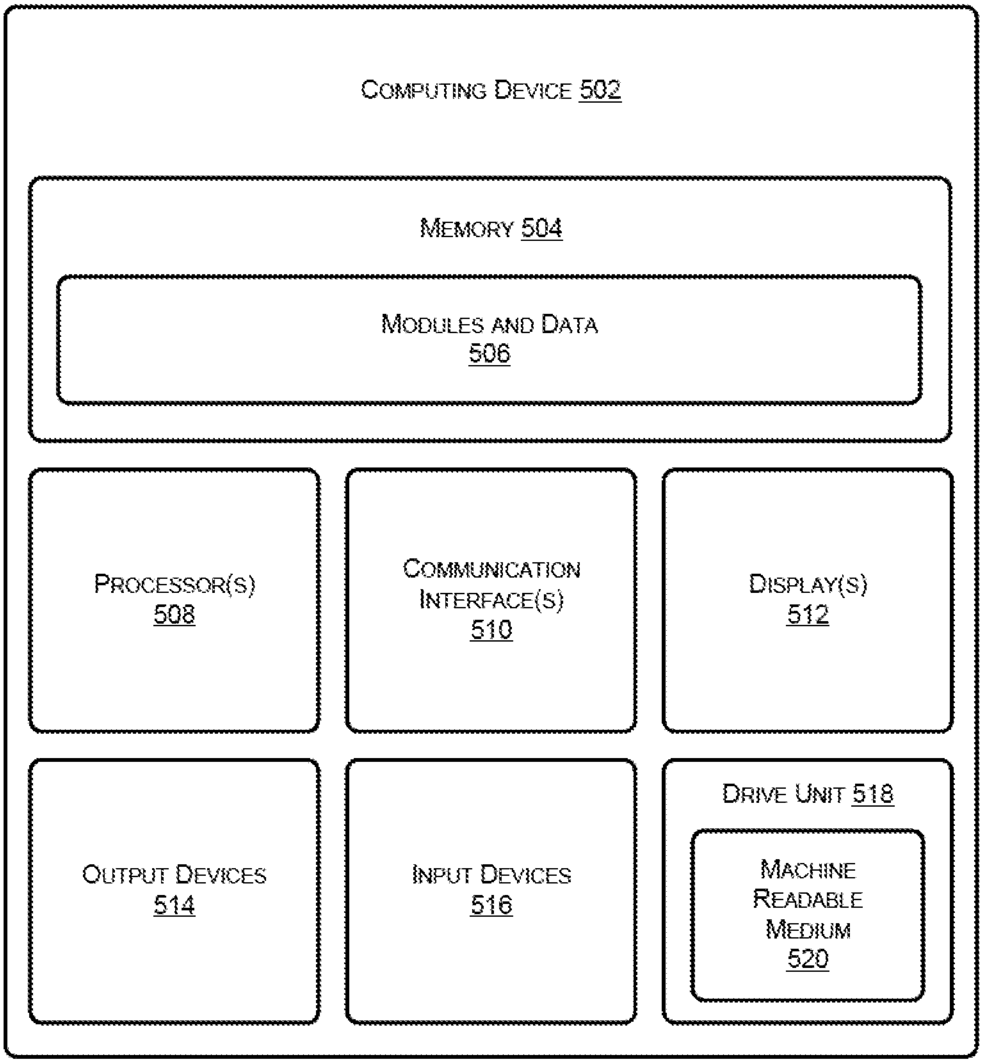
FIG. 5 shows an example system architecture for a computing device associated with the environment described herein.

FIG. 5 shows an example system architecture for a computing device 502 associated with the environment 100 described herein. A computing device 502 can be a server, computer, or other type of computing device that executes at least a portion of the environment 100. In some examples, elements of the environment 100 can be distributed among, and/or be executed by, multiple computing devices 502.

A computing device 502 can include memory 504. In various examples, the memory 504 can include system memory, which may be volatile (such as RAM), non-volatile (such as ROM, flash memory, etc.) or some combination of the two. The memory 504 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media.

Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by one or more computing devices 502 associated with the environment 100. Any such non-transitory computer-readable media may be part of the computing devices 502. The memory 504 can include modules and data 506 needed to perform operations of one or more computing devices 502 of the environment 100.

One or more computing devices 502 of the environment 100 can also have processor(s) 508, communication interfaces 510, displays 512, output devices 514, input devices 516, and/or a drive unit 518 including a machine readable medium 520.

In various examples, the processor(s) 508 can be a central processing unit (CPU), a graphics processing unit (GPU), both a CPU and a GPU, or any other type of processing unit. Each of the one or more processor(s) 508 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 508 may also be responsible for executing computer applications stored in the memory 504, which can be associated with common types of volatile (RAM) and/or nonvolatile (ROM) memory.

The communication interfaces 510 can include transceivers, modems, interfaces, antennas, telephone connections, and/or other components that can transmit and/or receive data over networks, telephone lines, or other connections.

The display 512 can be a liquid crystal display or any other type of display commonly used in computing devices. For example, a display 512 may be a touch-sensitive display screen and can then also act as an input device or keypad, such as for providing a soft-key keyboard, navigation buttons, or any other type of input.

The output devices 514 can include any sort of output devices known in the art, such as a display 512, speakers, a vibrating mechanism, and/or a tactile feedback mechanism. Output devices 514 can also include ports for one or more peripheral devices, such as headphones, peripheral speakers, and/or a peripheral display.

The input devices 516 can include any sort of input devices known in the art. For example, input devices 516 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 520 can store one or more sets of instructions (e.g., a set of computer-executable instructions), such as software or firmware that embodies any one or more of the methodologies or functions described herein. The instructions can also reside, completely or at least partially, within the memory 504, processor(s) 508, and/or communication interface(s) 510 during execution thereof by the one or more computing devices 502 of the environment 100. The memory 504 and the processor(s) 508 also can constitute machine readable media 520. The instructions may cause the processor(s) 508 to perform operations described in this document.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method comprising:

receiving, by a processor, a first event notification; and based on receiving the first event notification, executing, by the processor, an automated routine characterized by a first condition and a first transfer operation, wherein the automated routine is configured to:

retrieve an identifier represented by the first event notification, apply a one-way hash function to the identifier to determine a hashed identifier, determine, based on the hashed identifier, a retrieval key, retrieve, based on the retrieval key, a distributed record comprising the retrieval key and a first value, determine, based on the first condition and the first value, to execute the first transfer operation, based on determining to execute the first transfer operation, query a backend system, using the retrieval key, to retrieve first data, wherein the first data maps the retrieval key to a first account identifier, map, based on the first data, the retrieval key to the first account identifier;

based on mapping the retrieval key to the first account identifier, execute the first transfer operation in relation to the first account identifier and based on the first value, based on executing the first transfer operation, determine an execution outcome, and update the first value stored on the distributed record based on the execution outcome.

2. The method of claim 1, wherein the first condition represents a first threshold for the first value.

3. The method of claim 1, wherein executing the first transfer operation comprises:

determining, based on the automated routine, a transfer ratio;

determining a second value by applying the transfer ratio to the first value; and executing the first transfer operation by performing a transfer of the second value to the first account identifier.

4. The method of claim 1, further comprising:

receiving, by the processor, a registration request representing the identifier, the first value, and the first account identifier;

based on receiving the registration request, determining, by the processor, the retrieval key based on the identifier; and based on determining the retrieval key:

creating, by the processor, the distributed record based on the retrieval key and the first value, and storing, by the processor, the retrieval key and the first account identifier on the backend system.

5. The method of claim 1, wherein receiving the first event notification comprises:

receiving the first event notification from a trigger system, wherein the trigger system is configured to:

query a database to determine an event record, map the event record to the identifier, based on mapping the event record to the identifier, determine the first event notification based on the event record, and provide the first event notification to the processor.

6. The method of claim 1, further comprising:

based on updating the first value, receiving, by the processor, a second event notification representing the identifier; and based on receiving the first event notification, executing, by the processor, the automated routine, wherein the automated routine is configured to:

apply the first condition to the first value to refrain from executing the first transfer operation.

7. The method of claim 1, wherein the backend system stores the identifier, and wherein executing the first transfer operation comprises:

retrieving the identifier; and executing the first transfer operation based on the identifier and the first account identifier.

8. The method of claim 1, wherein;

retrieving the distributed record comprises querying a first database associated with a blockchain network, querying the backend system comprises querying a second database associated with the backend system, the first database is a publicly accessible distributed database that is configured to store non-sensitive data comprising the hashed identifier, and the second database is a private database.

9. A computing system, comprising:

a processor; and memory storing computer-executable instructions that, when executed by the processor, cause the computing system to perform operations comprising:

receiving a first event notification; and based on receiving the first event notification, executing an automated routine characterized by a first condition and a first transfer operation, wherein the automated routine is configured to:

retrieve an identifier represented by the first event notification, apply a one-way hash function to the identifier to determine a hashed identifier, determine, based on the hashed identifier, a retrieval key, retrieve, based on the retrieval key, a distributed record comprising the retrieval key and a first value, determine, based on the first condition and the first value, to execute the first transfer operation, based on determining to execute the first transfer operation, query a backend system, using the retrieval key, to retrieve first data, wherein the first data maps the retrieval key to a first account identifier, map, based on the first data, the retrieval key to the first account identifier;

based on mapping the retrieval key to the first account identifier, execute the first transfer operation in relation to the first account identifier and based on the first value, based on executing the first transfer operation, determine an execution outcome, and update the first value stored on the distributed record based on the execution outcome.

10. The computing system of claim 9, wherein the first condition represents a first threshold for the first value.

11. The computing system of claim 9, wherein executing the first transfer operation comprises:

determining, based on the automated routine, a transfer ratio;

determining a second value by applying the transfer ratio to the first value; and executing the first transfer operation by performing a transfer of the second value to the first account identifier.

12. The computing system of claim 9, the operations further comprising:

receiving, by the processor, a registration request representing the identifier, the first value, and the first account identifier;

based on receiving the registration request, determining, by the processor, the retrieval key based on the identifier; and based on determining the retrieval key:

creating, by the processor, the distributed record based on the retrieval key and the first value, and storing, by the processor, the retrieval key and the first account identifier on the backend system.

13. The computing system of claim 9, wherein receiving the first event notification comprises:

receiving the first event notification from a trigger system, wherein the trigger system is configured to:

query a database to determine an event record, map the event record to the identifier, based on mapping the event record to the identifier, determine the first event notification based on the event record, and provide the first event notification to the processor.

14. The computing system of claim 9, the operations further comprising:

based on updating the first value, receiving, by the processor, a second event notification representing the identifier; and based on receiving the first event notification, executing, by the processor, the automated routine, wherein the automated routine is configured to:

apply the first condition to the first value to refrain from executing the first transfer operation.

15. The computing system of claim 9, wherein the backend system stores the identifier, and wherein executing the first transfer operation comprises:

retrieving the identifier; and executing the first transfer operation based on the identifier and the first account identifier.

16. One or more non-transitory computer-readable media storing computer-executable instructions that, when executed by a processor, cause the processor to perform operations, comprising:

receiving a first event notification; and based on receiving the first event notification, executing an automated routine characterized by a first condition and a first transfer operation, wherein the automated routine is configured to:

retrieve an identifier represented by the first event notification, apply a one-way hash function to the identifier to determine a hashed identifier, determine, based on the hashed identifier, a retrieval key, retrieve, based on the retrieval key, a distributed record comprising the retrieval key and a first value, determine, based on the first condition and the first value, to execute the first transfer operation, based on determining to execute the first transfer operation, query a backend system, using the retrieval key, to retrieve first data, wherein the first data maps the retrieval key to a first account identifier, map, based on the first data, the retrieval key to the first account identifier;

based on mapping the retrieval key to the first account identifier, execute the first transfer operation in relation to the first account identifier and based on the first value, based on executing the first transfer operation, determine an execution outcome, and update the first value stored on the distributed record based on the execution outcome.

17. The one or more non-transitory computer-readable media of claim 16, wherein the first condition represents a first threshold for the first value.

18. The one or more non-transitory computer-readable media of claim 16, wherein executing the first transfer operation comprises:

determining, based on the automated routine, a transfer ratio;

determining a second value by applying the transfer ratio to the first value; and executing the first transfer operation by performing a transfer of the second value to the first account identifier.

19. The one or more non-transitory computer-readable media of claim 16, the operations further comprising:

receiving, by the processor, a registration request representing the identifier, the first value, and the first account identifier;

based on receiving the registration request, determining, by the processor, the retrieval key based on the identifier; and based on determining the retrieval key:

creating, by the processor, the distributed record based on the retrieval key and the first value, and storing, by the processor, the retrieval key and the first account identifier on the backend system.

20. The one or more non-transitory computer-readable media of claim 16, wherein receiving the first event notification comprises:

receiving the first event notification from a trigger system, wherein the trigger system is configured to:

query a database to determine an event record, map the event record to the identifier, based on mapping the event record to the identifier, determine the first event notification based on the event record, and provide the first event notification to the processor.

* * * * *